Sept. 29, 1953  G. N. HARDING ET AL  2,654,069
MOVEMENTS OF ELECTRICAL MEASURING INSTRUMENTS AND THE LIKE
Filed Oct. 26, 1949

GEORGE NELSON HARDING
OTTO FRANZ WILHELM THAL
Inventors
By Cushman, Darby & Cushman
Attorneys Patented Sept. 29, 1953

2,654,069

UNITED STATES PATENT OFFICE 2,654,069

MOVEMENTS OF ELECTRICAL MEASURING INSTRUMENTS AND THE LIKE

George N. Harding, Aldershot, England, and Otto Franz Wilhelm Thal, Bielefeld, Germany, assignors to Minister of Supply in His Majesty's Government of the United Kingdom of Great Britain and Northern Ireland, London, England Application October 26, 1949, Serial No. 136,863
In Great Britain September 3, 1948

4 Claims. (Cl. 324—151)

This invention relates to electrical instrument and like movements in which a control torque is afforded by a permanent magnet instead of by a hair spring as in conventional moving-coil type indicators. It is customary in such apparatus for provision for limiting the total angular deflection of the usual spindle and armature or rotor assembly to be made quite independently of the control torque means.

According to the present invention, in an electrical instrument or like movement employing a permanent magnet to provide control torque, this magnet and a neighboring part of the moving assembly are shaped and positioned to co-act with one another at different angular positions of the moving assembly to limit the permitted deflection of the latter, whereby adjustment of the said permanent magnet about the axis of movement not only shifts the "zero" position of the moving assembly but at the same time shifts in the same sense about said axis both limits of the permitted angular deflection of the moving assembly.

The "control" magnet may extend at one end into the path of two spaced abutments on the moving assembly to co-act with one of said abutments to limit the angular movement in the one direction and with the other of said abutments to limit the angular movement in the opposite direction.

In a preferred arrangement, the control magnet is a horseshoe shape with its limbs extending at their ends parallel with the spindle of a moving assembly and each into the path of two abutments, respectively, on the moving assembly.

An example of this latter arrangement is illustrated by the accompanying diagrammatic drawings of which:

Figure 1:
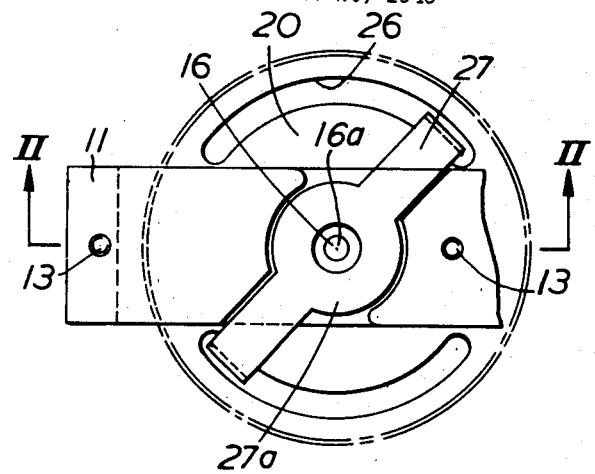
Figure 1 is a fragmentary plan view.

The three figures are not drawn to scale and are greatly enlarged to show the construction more clearly.

All the parts are carried by a rigid frame 11 of non-magnetic material. On the flat upper face of frame 11 a dial plate, indicated at 12, is secured by screws 13, 13. The upper part of the spindle of the moving assembly which is indicated at 15 has keyed thereto a non-magnetic gear wheel 20 via which motion is transmitted to a pointer or other indicator (not shown), and is supported by a V-type bearing member 16. Bearing member 16 is threaded and may be adjusted by means of slot 16a. The lower end of the moving assembly 15 comprises any well-known type of moving magnet 14.

The gear wheel 20 is formed with two diametrically opposed arcuate slots 26, 26 (Figure 1) each subtending an angle somewhat greater than ninety degrees at the center and into and through which depend the ends, respectively, of an inverted U-shaped magnet 27. The circumferential lengths of the slots 26 and the corresponding dimension, or width, of the ends of the magnet 27 are such as to limit the permitted angular movement to substantially 90 degrees by co-operation of the ends of the slots 26 as abutments with the ends of the magnet 27, the latter being the means which affords the control torque acting on the magnet 14 of the moving assembly. As is well understood, this control torque results from the flux of magnet 27 passing through the magnet 14.

Figure 2:
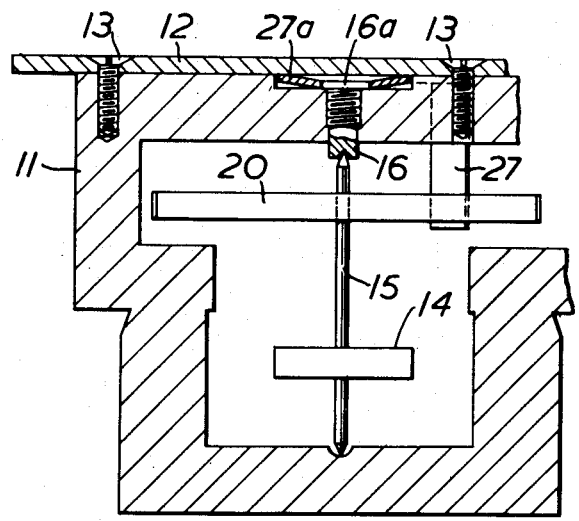
Figure 2 is a sectional elevation on the line 2—2 of Figure 1.
Figure 3:
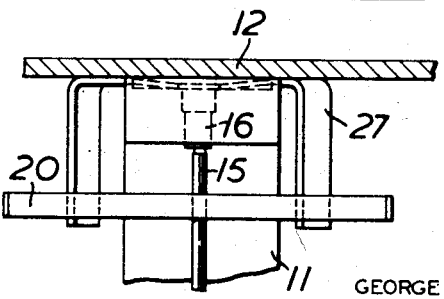
Figure 3 is a side elevation from the right hand side of Figure 1 of part of a moving magnet type instrument movement incorporating this form of the invention.

The magnet 27 is formed with a dished annular central portion 27a (Figures 1 and 2) which, with the adjacent laterally extending parts thereof, is located between the underside of the dial plate 12 and a cut away part of the upper face of the upper transverse limb of the frame 11 (Figure 2), the arrangement being such that when the screws 13, 13 which hold the dial plate 12 in position are tightened, the dished part 27a of the magnet is flattened (the "dishing" is exaggerated in Figure 2 for the sake of clearness) to such a degree that the magnet 17 is firmly held frictionally, though not so tightly as to prevent deliberate shifting thereof for the purpose of adjustment. It is to be understood that in Figure 1 the plate 12 is omitted. It is to be noted that any "zero" adjustment of the movement will at the same time adjust correspondingly both limits of permitted movement of the moving magnet 14. If desired, although this is not shown in the drawings, provision may be made for shifting the magnet 27 at will to adjust "zero" from the upper face of the dial plate 12 or from outside a casing (not shown) in which the movement is enclosed.

We claim:

1. In an electrical instrument movement having a moving assembly comprising a spindle and a magnet fastened on said spindle, a control magnet arranged to exert a control torque on the moving assembly, a mounting for the control magnet, the mounting means being arranged to allow for adjustment of the control magnet to set the zero position of the moving assembly, the control magnet and the moving assembly having parts which co-act with one another at different angular positions of said assembly and so limit the permitted movement of the latter, whereby adjustment of the control torque magnet to shift the zero position of the moving assembly at the same time shifts in the same direction both limits of the permitted movement of the moving assembly.

2. An electrical instrument movement as claimed in claim 1, wherein the moving assembly has two spaced abutments and wherein the control magnet extends at one end into the path of said abutments to co-act with the one abutment to limit the movement of the moving assembly in the one direction and to co-act with the other abutment to limit the movement of the moving assembly in the opposite direction.

3. An electrical instrument movement as claimed in claim 2, wherein the control magnet is substantially horse shoe shaped and is mounted with its limbs extending parallel with the spindle of the moving assembly each into the path of two spaced abutments, respectively, of the moving assembly.

4. In an electrical instrument movement, a fixed assembly comprising a rigid frame, a dial plate secured to the upper part of the frame, a moving assembly comprising a spindle supported by bearing members on the frame, and an abutment member mounted on the spindle for rotation therewith, the latter being formed with two diametrically opposed arcuate slots centered at the spindle, and a substantially horse shoe shaped control magnet which straddles the upper part of the frame and is held frictionally between the latter and the dial plate with its ends depending into two arcuate slots, respectively, of the member fast on the spindle, whereby the control torque magnet serves, by cooperation with the ends of said slots or abutments to limit the permitted angular movement of the moving assembly as well as to determine the zero position of said assembly in accordance with the angular position of said control magnet about the spindle axis.

GEORGE N. HARDING.
OTTO FRANZ WILHELM THAL.

References Cited in the file of this patent
UNITED STATES PATENTS

| Number | Name | Date |
|---|---|---|
| 440,291 | Weston | Nov. 11, 1890 |
| 570,454 | Coleman | Nov. 3, 1896 |
| 1,118,678 | Patrick | Nov. 24, 1914 |
| 2,326,252 | Rich | Aug. 10, 1943 |
| 2,380,609 | Pearce | July 31, 1945 |
| 2,478,329 | Shaper | Aug. 9, 1949 |
| 2,493,376 | Zar | Jan. 3, 1950 |